G. MIDBOE.
DRIVING MECHANISM FOR MOTOR VEHICLES.
APPLICATION FILED MAY 10, 1919.
1,373,142.  Patented Mar. 29, 1921.
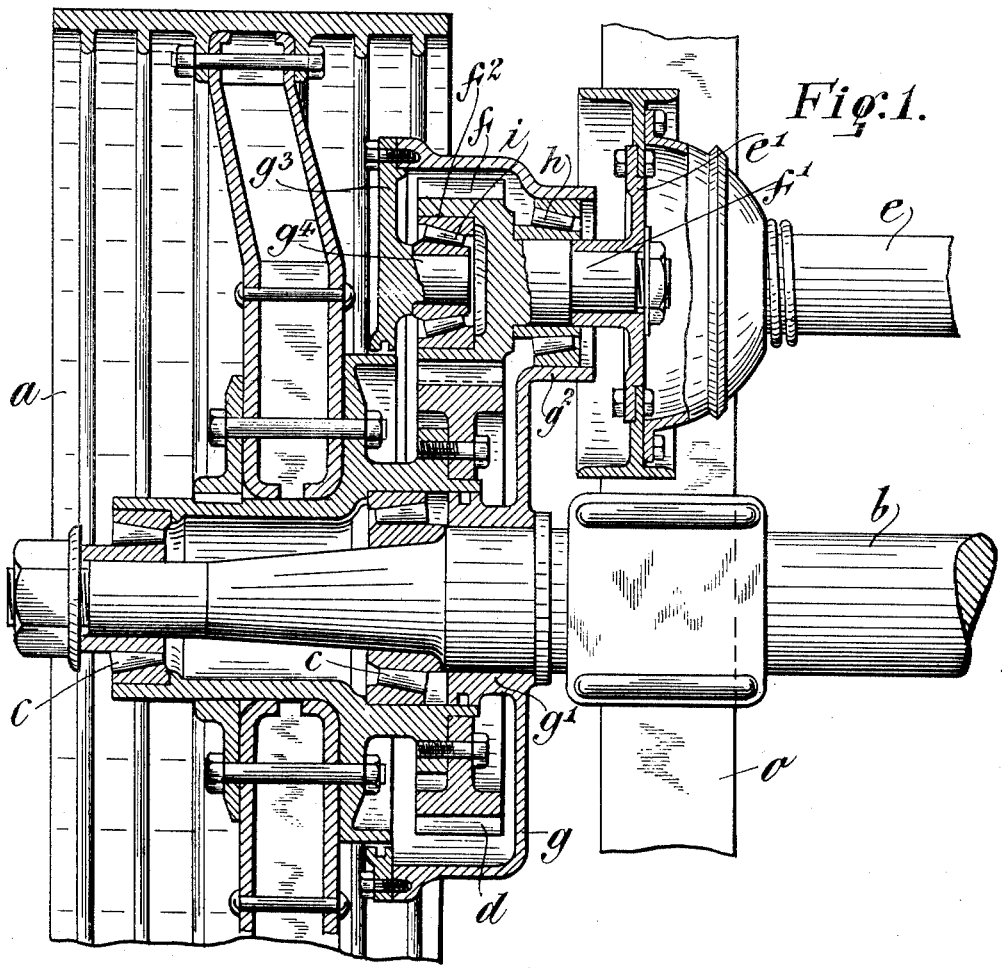
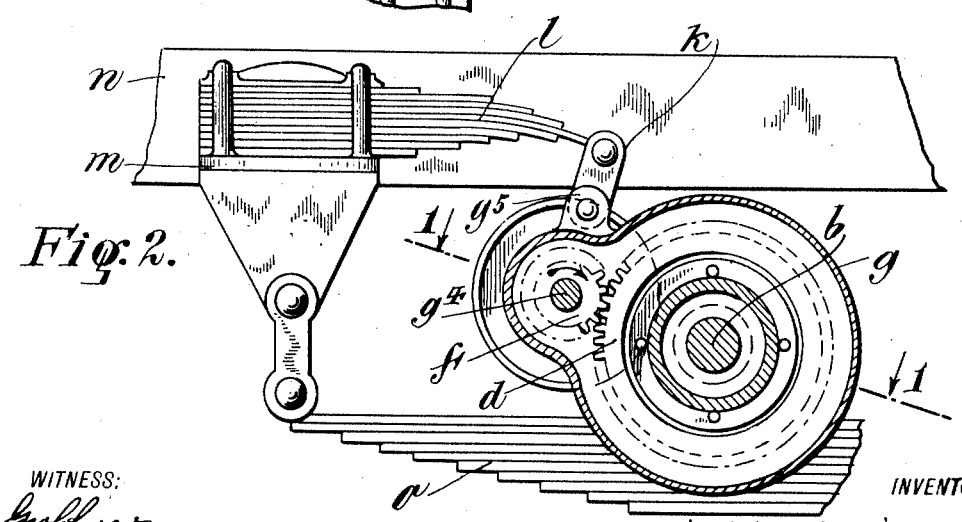
WITNESS:
INVENTOR
BY
ATTORNEYS

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

DRIVING MECHANISM FOR MOTOR-VEHICLES.

1,373,142.  Specification of Letters Patent.  Patented Mar. 29, 1921.

Application filed May 10, 1919. Serial No. 296,215.

*To all whom it may concern:*

Be it known that I, GABRIEL MIDBOE, a citizen of the United States, residing in the borough of Brooklyn, of the city of New York, in the State of New York, have invented certain new and useful Improvements in Driving Mechanism for Motor-Vehicles, of which the following is a specification, reference being had to the accompanying drawing, forming a part hereof.

This invention relates to the type of driving mechanism for motor vehicles in which the live axle sections are independent of the dead axle and the power is applied to the wheels from the live axle sections through interposed gearing. In this type of drive it is necessary to take up the torque reaction from the driving pinion and this torque reaction has usually been transmitted through inflexible members attached either to the dead axle or to the vehicle frame. The present invention has for its object to provide a flexible drive of such design that the torque reaction is absorbed by a resilient member which, in addition to insuring a flexible drive and relieving the mechanism from undue strains, will return the power initially absorbed to the driving pinion in a form available for useful work. A further object is to provide a construction of the character described which shall be simple in form, compact, and readily applied to the vehicle.

Reference is now to be had to the accompanying drawing for a detailed description of one embodiment of the invention, in which—

Figure 1 is a fragmentary view, partly in plan and partly in horizontal section, of the improved driving mechanism showing its application to a vehicle wheel, the section being taken along the plane indicated by the line 1—1 of Fig. 2 and looking in the direction of the arrows.

Fig. 2 is a fragmentary view, partly in side elevation and partly in section, of the mechanism shown in Fig. 1, the vehicle wheel and dead axle being omitted.

The vehicle wheel $a$ is supported on the dead axle $b$ through roller bearings $c$ and has secured to the inner face of its hub a spur gear $d$ by which power is applied to the wheel for traction. The live axle section $e$ is independent of the dead axle $b$ and is connected through a universal joint, indicated generally at $e'$, to a driving spur pinion $f$. This spur pinion $f$ with the spur gear $d$ with which the pinion meshes is inclosed in a housing $g$ formed with a tubular bearing flange $g'$ through which the dead axle passes. By means of the bearing flange $g'$ the housing $g$ is supported rotatably on the dead axle. The housing $g$ is also formed with a tubular flange $g^2$ through which the shaft $f'$ of the pinion $f$ passes. Roller bearings $h$ for the pinion shaft $f'$ are supported in the tubular flange $g^2$. The housing $g$ has secured thereto a detachable back plate $g^3$ on which is formed a bearing boss $g^4$ which is adapted to be alined with the pinion shaft $f'$ and to enter a circular recess $f^2$ formed in the face of the pinion. Between the boss $g^4$ and the pinion may be interposed a roller bearing $i$ which, with the roller bearing $h$, supports the pinion $f$ as well as the end of the live axle section $e$ and maintains the pinion in proper mesh with the spur gear $d$. From Fig. 2 it appears that the casing $g$ has formed on its outer wall a lug $g^5$ which is connected through a link $k$ with a spring $l$ supported on a bracket $m$ secured to the side frame member $n$ of the vehicle. This bracket $m$ may be the bracket by which the side frame member $n$ is supported on the main vehicle spring $o$.

The action of the driving mechanism in coöperation with the resilient torque reaction spring $l$ appears to be about as follows: On application of power from the live axle $e$ in starting the vehicle the driving pinion $f$ rotates in a clockwise direction, as indicated by the arrow in Fig. 2. This pinion $f$ in transmitting power to the spur gear $d$ tends to creep up the spur gear. This tendency is counteracted solely by the spring $l$ which yields somewhat under the torque reaction and thereby relieves the driving mechanism from undue strain. Accordingly, while the driving power is thus applied yieldingly to the spur gear $d$ a certain amount of energy, by reaction, is stored in the spring $l$. As soon as the vehicle is set in motion and this initial torque reaction removed, the spring $l$ will tend to resume its normal position and force the pinion $f$ downward along the spur gear $d$, thereby returning some of the stored up energy to the pinion in form for useful work. The net result is a more steady and effective starting torque applied at the point desired and elimination of the undue strains on the driving mechanism which are usually present in an inflexible drive.

It is to be understood that the spring $l$ is merely one form of a yielding torque reaction member and that the effects described may be obtained by associating with the driving mechanism a corresponding member which will insure a flexible drive although such member is found in different form and position. It is also evident that the invention is not to be limited in its application to the precise driving mechanism shown, but that it may be applied with an equivalent arrangement of gearing or, for instance, with an internal gear drive where much the same torque reactions are present.

Reference is to be had to the appended claims for definition of the scope of the invention.

I claim as my invention:

1. In a motor vehicle, in combination with the traction wheel and dead axle on which the wheel is supported, a gear secured to the wheel, a driving pinion operatively engaged with the gear, a live axle section independent of the dead axle and connected to the pinion, a housing in which the pinion is journaled, and a yielding torque reaction member operatively connected to the housing.

2. In a motor vehicle in combination with the traction wheel and dead axle, a live axle section independent of the dead axle, a driving pinion on the live axle section in driving engagement with the wheel, said pinion being formed with a recess in its face, a housing for the pinion rotatably mounted on the dead axle and formed with a tubular flange to receive the pinion shaft, means to hold the housing against rotative movement, bearings in the flange for the pinion, a back plate for the housing having a boss to enter the recess in the pinion and axially alined therewith, and bearings for the pinion interposed between the boss and the pinion.

3. In a motor vehicle, in combination with the traction wheel and dead axle, a gear secured to the wheel hub, a pinion in driving engagement with the gear, said pinion having its face recessed, a live axle section on which the pinion is mounted, a housing through which the dead axle extends rotatably mounted on the dead axle and inclosing both the pinion and the gear, bearings in the housing for the pinion positioned in the face and also around the shaft thereof, and a yielding torque reaction member operatively connected to the housing.

This specification signed this 8th day of May A. D. 1919.

GABRIEL MIDBOE.